United States Patent [19]
Hochgatterer

[11] Patent Number: 5,324,424
[45] Date of Patent: Jun. 28, 1994

[54] MEMBRANE SYSTEM FOR TREATING WATER USING COMPRESSED AIR TO PRESSURIZE RESERVOIR

[76] Inventor: Josef Hochgatterer, Taborstrasse 19, A-4360 Grein, Austria

[21] Appl. No.: 36,714

[22] Filed: Mar. 25, 1993

[30] Foreign Application Priority Data

Mar. 27, 1992 [AT] Austria ................... 627/92

[51] Int. Cl.⁵ ............................................. B01D 61/12
[52] U.S. Cl. ................................. 210/123; 210/257.2; 210/258; 210/321.65; 261/76; 261/121.1
[58] Field of Search ............... 210/123, 137, 257.1, 210/257.2, 258, 259, 321.6, 321.65, 416.3, 652; 261/76, 121.1, DIG. 7

[56] References Cited

U.S. PATENT DOCUMENTS

| | | | |
|---|---|---|---|
| 573,288 | 10/1898 | Langdon et al. | 210/257.1 |
| 3,747,763 | 7/1973 | Kain | 210/257.2 |
| 4,502,953 | 3/1985 | Marsh et al. | 210/94 |

FOREIGN PATENT DOCUMENTS 51-24586 2/1976 Japan ................... 210/652

*Primary Examiner*—Joseph W. Drodge
*Attorney, Agent, or Firm*—Collard & Roe

[57] ABSTRACT

The water-treating apparatus includes a membrane filter, which at its inlet end is adapted to be connected by a prefiltering filter to a water supply line and serves to treat water by reverse osmosis and at its outlet end is connected to a waste water line and a pure water line, which opens into a drinking water tank, which is constituted by a diaphragmless container, which is connected to an air supply system for supplying compressed air to the tank driven by waste water in the waste line and from which a rising line extends to a dispenser for drinking water.

5 Claims, 2 Drawing Sheets

MEMBRANE SYSTEM FOR TREATING WATER USING COMPRESSED AIR TO PRESSURIZE RESERVOIR

BACKGROUND OF THE INVENTION

1. Field of the Invention

This invention relates to an apparatus for treating water, comprising a membrane filter, which at its inlet end is adapted to be connected by a prefiltering filter to a water supply line and serves to treat water by reverse osmosis and at its outlet end is connected to a waste water line and a pure water line, which opens into a drinking water tank, which is constituted by a diaphragmless container, which is connected to air supply means for supplying compressed air to said tank and from which a rising line extends to a dispenser for drinking water.

2. Description of the Prior Art

Owing to the progressively increasing pollution of the groundwater, many waterworks can no longer supply water having the quality of true drinking water and it is hardly possible still to comply with legally prescribed limits for the contents of pollutants in the water. As a result, water from the main may adversely affect the health. Apparatuses for treating water are mounted in most cases under a washbasin and are intended to purify tap water in order to prepare healthy drinking water. Membrane filters for a reverse osmosis have proved most satisfactory for that purpose. Reverse osmosis is a naturally performed method of treating water without heating or chemically changing the water. In that method, water under line pressure is forced against a semipermeable membrane, which has microscopically small pores, by which the water molecules are separated from the pollutant molecules. This is due to the fact that the water molecules can penetrate through the membrane whereas the larger pollutant molecules are rejected by the pores and are enriched in the waste water. As a result, the permeate delivered by the membrane filter is pure and healthy water and the waste water is discharged as a pollutant concentrate through the waste water line. Most of the known water-treating apparatuses of that kind comprise a drinking water tank, which constitutes a pressure accumulator, which contains a rubber diaphragm to provide the water pressure that is required for a tapping of drinking water. But that rubber diaphragm deteriorates the taste of the water and for this reason the tank must be succeeded by an active carbon filter, which adds to the cost of the apparatus. Besides, bacteria may accumulate on the rubber diaphragm and also in the active carbon filter and will inevitably introduce germs into the water. That risk is further increased by the fact that the pressure accumulator is permanently sealed at its top so that it is virtually impossible to clean the interior of the drinking water tank and the rubber diaphragm and an accumulation of bacteria cannot be prevented in the long run. A further disadvantage of the known diaphragm pressure accumulators resides in that they apply to the membrane filter a considerable backpressure by which the rejection of pollutants in the reverse osmosis is adversely affected.

U.S. Pat. No. 4,502,953 discloses a water-treating apparatus in which the drinking water tank does not contain a diaphragm and a tapping of water is permitted by means for supplying compressed air to said tank and a rising line. For that purpose a cushion of compressed air introduced through an inlet valve is permanently maintained above the water level in the tank and is utilized to force water through the rising line to the drinking water dispenser as required. In that case a special control valve is required to prevent an escape of the compressed air as the tank is being exhausted. This requirement may give rise to malfunction. Besides, the pressure conditions change in dependence on the level of the water in the tank and on temperature so that the tapping conditions are not uniform. The tank must consist of a pressure container, and the high backpressure also adversely affects the reverse osmosis.

SUMMARY OF THE INVENTION

For this reason it is an object of the invention to eliminate said disadvantages and to provide a water-treating apparatus which is of the kind described first hereinbefore and in which the purifying action, the reliability of the function and the quality of the discharged water are increased in an economical manner.

That object is accomplished in accordance with the invention in that the air supply means comprise a pump, which is adapted to be driven by the waste water in the waste water line, and a discharge line is connected to the discharge side of said pump and opens into the tank. Such a tank constitutes a true low-pressure container and may be provided with a suitable cover, which can be removed to permit the tank to be cleaned so that an accumulation of germs and a formation of nitrites can be prevented; this result will be promoted by the absence of a rubber diaphragm. The supply of fresh air to the tank by the pump causes the water to be enriched with oxygen so that its quality will be improved. A slightly superatmospheric pressure of, e.g., 0.5 bar will be sufficient for a dispensing of water from the tank through the dispenser for drinking water. For the supply of compressed air, the pump is driven by the waste water in the waste water line so that extraneous energy is not required. The pump may be of any desired type. For instance, the pump may consist of a piston machine that is controlled by sliding valves, like a steam-driven piston engine, or of a rotary machine or gear pump, so that the kinetic energy of the waste water can be utilized to drive the air supply pump. Because the supply of compressed air to the drinking water tank eliminates the need for a rubber diaphragm in said tank, the taste of the water will not be affected by the rubber of such diaphragm and the tank need not be succeeded by an activated carbon filter, in which bacteria could also be accumulated. Because the superatmospheric pressure in the tank is only low, a high pressure difference for an effective reverse osmosis will be ensured in the membrane filter which precedes the tank. As a result, the operating pressure of about 4 bars which is provided by the line pressure can effectively be utilized and pollutants will be much more effectively rejected by the membrane filter.

In accordance with the invention the pump may be incorporated in the pure water line, which in that case is provided with an air-aspirating valve upstream of the pump, so that the pump will suck the pure water as well as fresh air. This will favorably influence the pressure conditions in the membrane filter and will permit an optimum utilization of the superatmospheric pressure in the water supply line for the reverse osmosis. Besides, the structural expenditure will be reduced further because a common discharge line for pure water and air extends from the pump to the tank.

The discharge line may open in the tank for drinking water adjacent to its bottom. In that case the water will be more effectively enriched with oxygen by the air which is supplied and the water will be agitated in a favorable manner.

To permit a control of the pressure in the tank for drinking water, said tank is provided with a relief valve and the discharge line is provided in the tank for drinking water with a float-controlled shut-off valve. In that case a constant superatmospheric pressure will be maintained in the tank and, as a result, constant conditions will be maintained in the membrane filter.

DETAILED DESCRIPTION OF THE PREFERRED EMBODIMENT

Figure 1:
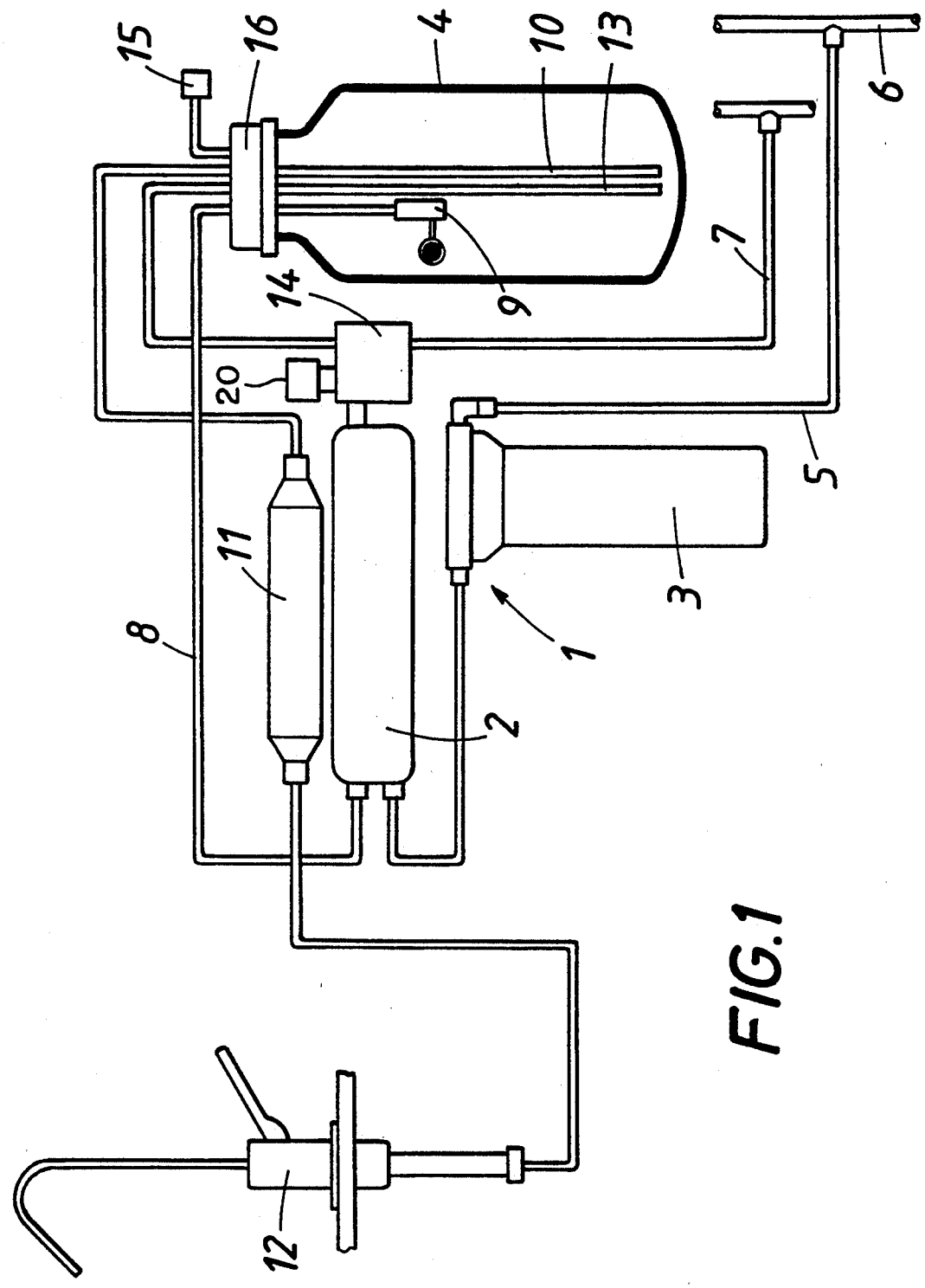
FIGS. 1 and 2 are schematic representations of two illustrative embodiments of the invention.

This invention will now be explained more in detail with reference to the drawing.

The water-treating apparatus 1 shown in FIG. 1 comprises a membrane filter 2 for treating water by reverse osmosis, a prefiltering filter 3, which is connected to the membrane filter 2 at its inlet end, and a drinking water tank 4, which is connected to the membrane filter 2 at its outlet end. The membrane filter 2 can be connected to a water supply line 6 by an inlet line 5, which is connected to the prefiltering filter 3. The membrane filter 2 contains a semipermeable membrane, by which pollutants are rejected. The waste water which has been enriched with pollutants is conducted under pressure through a waste water line 7 and may possibly be used for washing and cleansing purposes. Pure water, which is free of pollutants, penetrates through the membrane and flows through a pure water line 8 into a drinking water tank 4. The water level in the tank 4 is controlled by a float-controlled shut-off valve 9 associated with the pure water line 8 within the tank 4.

The drinking water tank 4 consists of a diaphragmless low-pressure container and is connected to a rising line 10, which extends through a ceramic filter 11 to a drinking water dispenser 12. Compressed air is supplied from source 20 to the drinking water tank 4 by a pump 14 through a discharge line 13. The pump 14 comprises a drive, which is incorporated in the waste water line 7 and arranged to be driven by the waste water in that waste water line. As a result, no extraneous energy is required to drive the pump. The drive of the pump may consist of a piston engine or machine or rotary machine, which is not shown and which permits the kinetic energy of the waste water to be utilized to drive the pump. The drinking water tank 4 is provided with a relief valve 15 for limiting the superatmospheric pressure in the tank to a low value, which is sufficient for a discharge of drinking water from the tank 4 but ensures that the backpressure applied to the membrane filter 2 will be sufficiently low for an effective reverse osmosis. The tank 4 can be sealed in a simple manner by means of a removable cover 16 and can easily be cleaned when that cover has been removed. For this reason an ingress of germs into the drinking water need not be feared.

Figure 2:
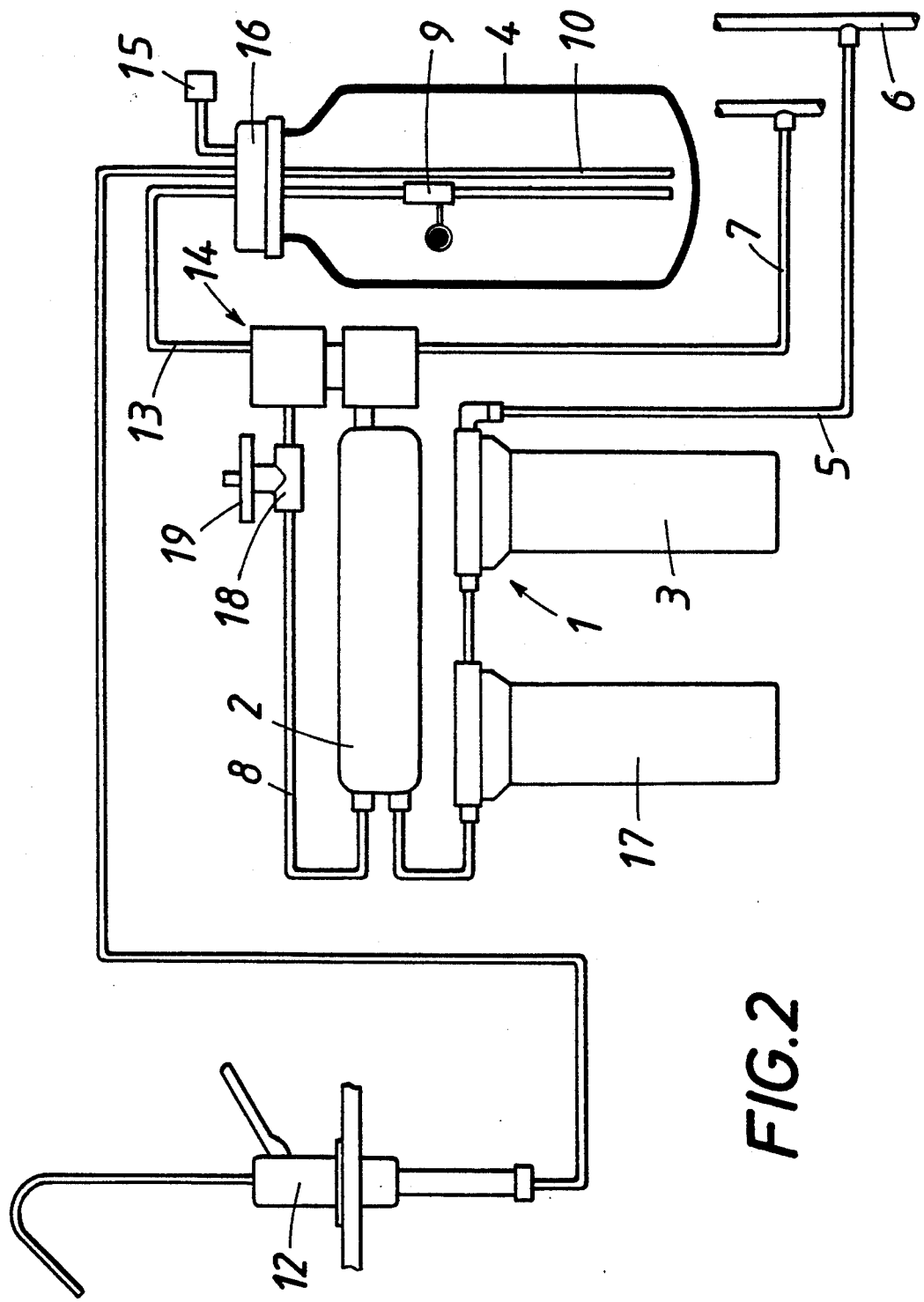

FIG. 2 shows a slightly modified embodiment of a water-treating apparatus. Like parts of the apparatus are designated by the same reference characters as in FIG. 1. In case of need the prefiltering filter 3 which precedes the membrane filter 2 may consist of an activated carbon filter for filtering chlorinated water or a ceramic filter 17 for filtering unchlorinated water. The pump 14 which succeeds the membrane filter 2 and is driven by the waste water may be incorporated in the pure water line 8. In that case the pure water line 8 is provided upstream of the pump 14 with an air-aspirating valve 18, which contains a bacteria-rejecting filter 19, so that the pump 14 sucks pure water and air and discharges a mixture of water and air through the discharge line 13 into the drinking water tank 4 to supply water and compressed air to said tank. In that case the fact that the pure water is directly sucked from the membrane filter 2 ensures optimum pressure conditions for the reverse osmosis.

I claim:

1. In a water-treating apparatus comprising
a membrane filter for treating water by a reverse osmosis, which filter has an inlet end and an outlet end,
a prefiltering filter upstream of said membrane filter inlet end and adapted to be connected to a water supply line,
a diaphragmless drinking water tank, which is sealed at its top,
pure water line means connecting said tank to said membrane filter at its outlet end,
a waste water line connected to said membrane filter at its outlet end and arranged to conduct waste water under pressure from said membrane filter,
air supply means connected to said tank to supply compressed air thereto,
a drinking water dispenser, and
a line rising from said tank and connected to said dispenser,
the improvement residing in that
said air supply means comprises a pump that is arranged to be driven by waste water in said waste water line and is connected to a discharge line opening in said tank.

2. The improvement set forth in claim 1, wherein
said pump and said discharge line are incorporated in said pure water line means and
an air-aspirating valve is connected to said pure water line means upstream of said pump.

3. The improvement set forth in claim 1, wherein said discharge line opens in said tank near the bottom thereof.

4. The improvement set forth in claim 1, wherein
said tank is provided with a relief valve and
said discharge line is provided within said tank with a float-controlled shut-off valve.

5. The improvement set forth in claim 1, wherein said drinking water tank is sealed at its top by a detachably mounted cover.

* * * * *